June 18, 1957           D. W. BINNS           2,796,060
OVEN CONSTRUCTION FOR GAS OR ELECTRIC RANGES
Filed Dec. 26, 1951           2 Sheets-Sheet 1
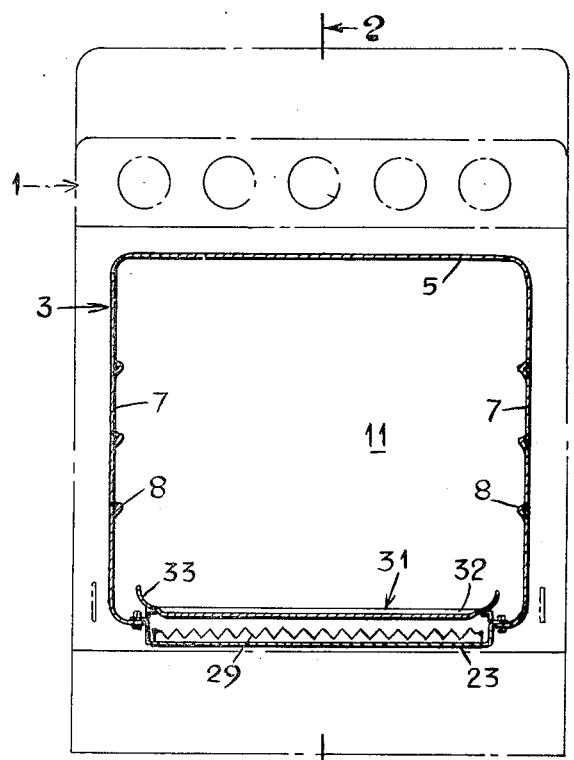
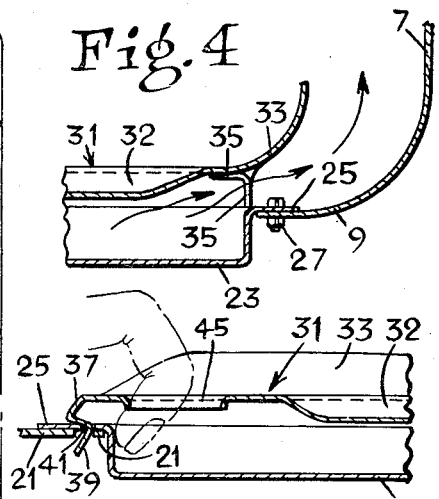
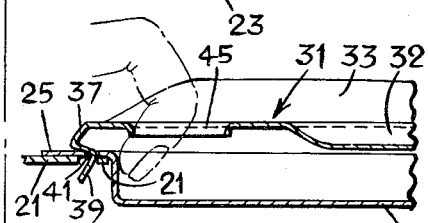
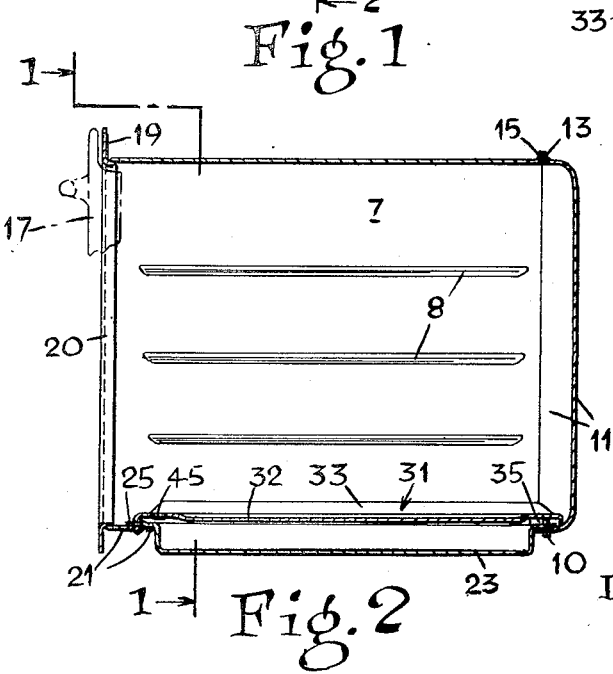
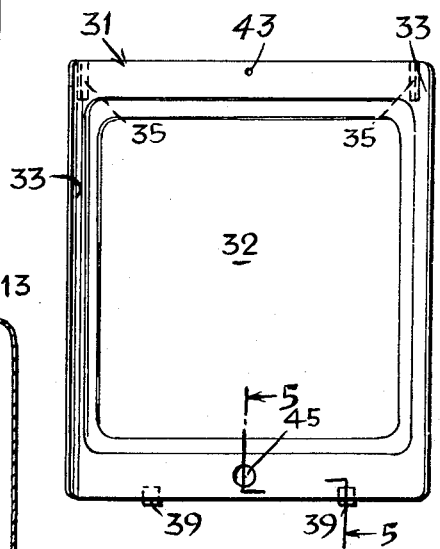
INVENTOR:
Douglas W. Binns,
BY Ralph F. Staubly
ATTORNEY.

June 18, 1957  D. W. BINNS  2,796,060
OVEN CONSTRUCTION FOR GAS OR ELECTRIC RANGES
Filed Dec. 26, 1951  2 Sheets-Sheet 2

INVENTOR:
Douglas W. Binns,
BY Ralph F. Staubly
ATTORNEY.

United States Patent Office 2,796,060
Patented June 18, 1957

2,796,060

OVEN CONSTRUCTION FOR GAS OR ELECTRIC RANGES

Douglas W. Binns, Nashville, Tenn.

Application December 26, 1951, Serial No. 263,369

3 Claims. (Cl. 126—273)

This invention relates to an oven construction for gas or electric ranges, and more particularly to an oven having an easily removable combined bottom and drip-pan.

Ovens of the prior art generally have had fixed bottoms, or bottoms that are difficultly removable. Most ovens do not have drip pans, but, when they do, such pans are separate structures, adding to the cost and cumbersomeness of the construction, while detracting from its thermal efficiency. The present disclosure overcomes these disadvantages and produces a simple, efficient, and less costly oven having an easily removed combined oven bottom and drip-pan, which is also designed to produce a uniformity of heat distribution without the use of a complicated system of baffles and heat-distributing members.

Accordingly, it is an object of this invention to provide an oven of simple design having an easily removable bottom which serves also as a drip-pan and as a heat-distributing baffle.

It is another object of the invention to produce a drip-pan bottom for an oven, interchangeably usable with gas and electric ovens of similar size and shape.

It is a still further object to provide an oven having integral top and side walls, and a removable bottom member overlying inturned flanges at the lower edges of the side walls.

These and other objects and advantages of the invention will become apparent as the following detailed description proceeds.

In the drawings, which form a part of this specification and in which like reference characters refer to like parts thruout the several views:

Fig. 1 is a front elevational view in section, taken on the line 1—1 of Fig. 2 of an electric oven incorporating the invention, the conventional range structure carrying the oven being shown in phantom.

Fig. 2 is a side elevational sectional view of the oven proper taken on the line 2—2 of Fig. 1.

Fig. 3 is a plan view of the combined oven bottom and drip-pan.

Fig. 4 is an enlarged view in section of the showing of the lower right portion of the oven of Fig. 1.

Fig. 5 is an enlarged sectional view of the lower left portion of the showing of Fig. 2, taken on the line 5—5 of Fig. 3.

Figure 6:
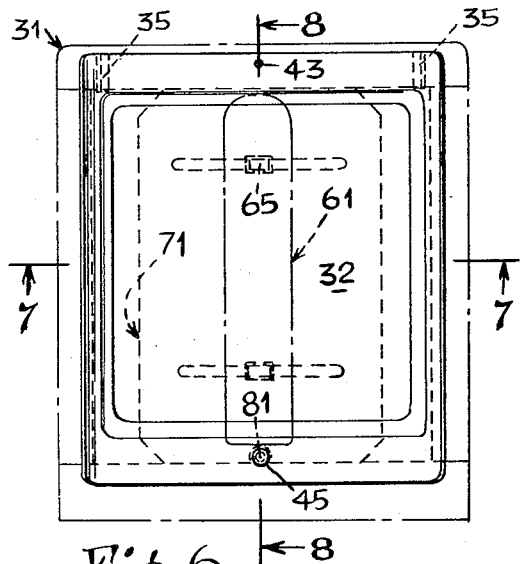
Fig. 6 is a plan view of the combined bottom and drip-pan, shown installed in a typical gas oven.

With reference now to the drawings, Fig. 1 discloses an electric range generally designated as 1 and carrying an oven 3 embodying the present invention.

The oven 3 is preferably formed of a unitary sheet of metal bent (as shown in Fig. 1) to form the top 5, side walls 7 and the extreme lateral portions 9 of the bottom, which portions are simply and economically made as inturned flanges at the lower edges of the side walls. The back wall of the oven is a die-formed pan-shaped panel 11, having an outwardly extending flange 13 on its top and side edges for connection to similar flanges 15 on the top and side walls of the oven 3, by welding or other conventional methods.

The front of the oven comprises the usual hinged door 17 (partly shown in phantom in Fig. 2) shaped to abut the face of and to extend into the door frame 19. Frame 19 has a sill portion 21, which may be formed integral therewith, if desired. The door frame 19 optionally can be made of a narrow strip of sheet metal shaped like the walls 5 and 7, and flanged outwardly to form the face surfaces, or be stamped from a flat sheet of metal flanged inwardly at 20 for connection to walls 5 and 7. The side walls 7 are shown as having conventional rack-supporting die-formed ribs 8.

When an electric heater is used with an oven constructed according to this invention, a shallow metallic pan 23 is inserted into the open bottom of the chamber formed by wall sections 5, 7, 9 and 11. The pan 23 has integral laterally extending flanges 25 which overlie the edges of the bottom opening, and may be fastened thereto as by bolts and nuts 27 or by other conventional means.

A conventional frame-mounted electric heater 29 (schematically shown in Fig. 1) lies in the pan 23 and is connected in conventional manner, as by plug-and-socket connectors (not shown), to the power supply.

A principal portion of the novelty herein resides in the mechanical design of the easily removable oven bottom and drip-pan 31, and in its cooperation with the oven proper. The drip-pan bottom 31 is die-formed of sheet metal to have a large depressed central area 32 forming a relatively shallow but adequate reservoir for catching spilled or overflowed liquids for either immediate or later disposal. This protects the heater and also obviates the difficult operation of scraping the oven bottom after the spilled liquid has hardened or burned. With this construction the drip-pan bottom can be soaked with water or other cleaner without fear of damage to the heater.

The lateral marginal portions of the drip-pan bottom have outwardly and upwardly curved extensions 33 spaced from the sub-bottom formed by pan 23, heater 29 and the inwardly directed flanges 9 of the side walls 7. The space so provided permits flow of hot air from the heater-carrying pan 23 into the sides of the oven chamber, as indicated by the arrows in Fig. 4.

Welded to the under surface of the drip-pan bottom near its rear corners, are two longitudinally extending angle bars 35, which serve as supports for the drip-pan bottom and also as heat baffles to prevent too much heated air escaping from the pan 23 into the rear corners of the oven chamber. The front edge of the drip-pan bottom has a reversely bent curved lip portion 37, which is provided with two or more downturned tab-like fingers or extensions 39. The fingers 39 preferably extend forwardly (or rearwardly if desired) at an angle of about 15° from the vertical, and enter transverse narrow slots 41 (Fig. 5) in the pan 23 and/or sill 21. This angle should be great enough to prevent accidental lifting of the drip-pan bottom, but should permit removal of the same without requiring enough tipping to cause spillage of any liquid lying in the depression 32 therein.

The drip-pan bottom may have one or more small openings 43 in its rear margin for insertion of bolts or screws for positive locking of the bottom in place, if desired, for example for shipping. It is also preferably provided with a large centrally located multiple-purpose opening 45 in its front margin. This opening 45 increases the flow of hot air into the door portion of the oven (where heat losses are greatest), constitutes a finger hole to assist in placement and removal of the drip-pan bottom, and also makes the drip-pan bottom interchangeably usable with a gas-burning oven of similar construction, in which it serves as an igniting vent. This alternative use will now be described.

Figure 9:
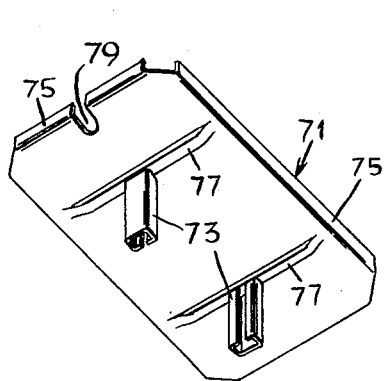
Fig. 9 is an isometric view, from below, of the burner-carried heat-baffle shown in Figs. 6–8.
Figure 7:
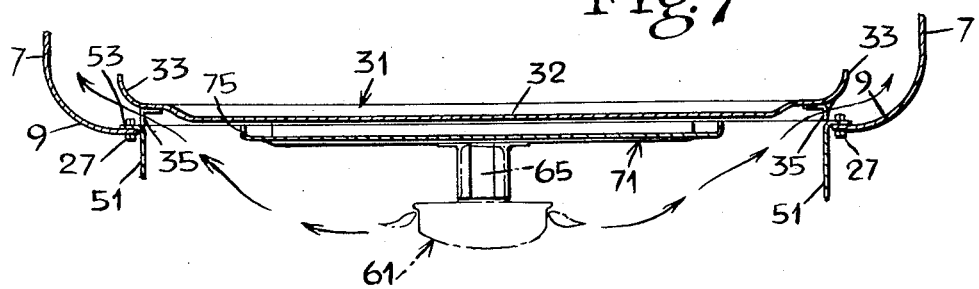
Fig. 7 is an enlarged elevational sectional view taken on the line 7—7 of Fig. 6.
Figure 8:
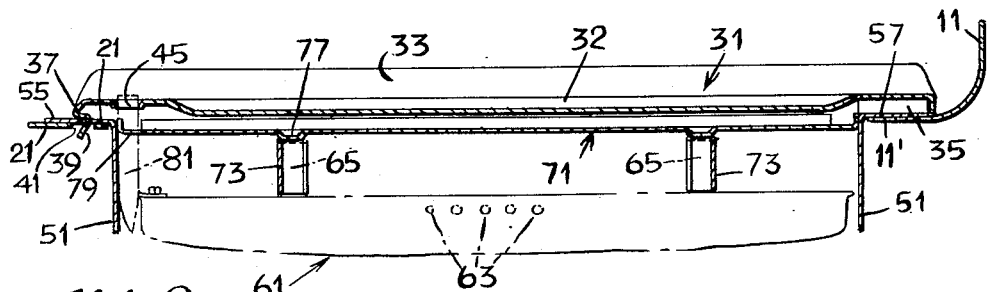
Fig. 8 is an enlarged elevation in section taken on the line 8—8 of Fig. 6.

In the gas-burning oven modification of Figs. 6–9, the oven proper and the drip-pan bottom are of constructions identical with those described above, and thus do not need to be described again, since the same reference numerals have been applied to like parts in the two species disclosed. In place of the shallow pan used with the electric oven, a gas-burner chamber is formed by a much deeper sheet-metal member 51 having side flanges 53 resting on wall flanges 9, and front and rear flanges 55 and 57 resting on door sill 21 and flange 11' of the rear wall 11, respectively. The bottom (not shown) to the heating chamber partially defined by member 51, may or may not be carried by and/or be integral with said member 51. Mounted in said chamber in any desired manner is a conventional gas burner 61, having longitudinally extending rows of flame-jet openings 63. The burner 61 is preferably formed of cast metal having integral upstanding lugs 65 on its upper surface. These lugs 65 serve as supports for a heat-distributing and oven-bottom protecting baffle 71, having sheet-metal sockets 73 of C-shaped cross-section welded to its bottom and tightly engageable over said lugs. Baffle 71 lies closely adjacent to, but preferably does not contact, the drip-pan bottom 31. Baffle 71 has upturned marginal flanges 75 which strengthen the baffle and assure its proper spacing from the oven bottom. Depressed ribs 77 also increase the rigidity of the baffle. Notch 79 accommodates the ignition tube 81, which is mounted on the front end of burner 61, and which terminates in or near the opening 45 in the front marginal portion of the drip-pan bottom.

While I have disclosed a preferred embodiment of the invention, as applied to typical gas and electric ranges, it is to be understood that many changes can be made in the size, construction and arrangement of the parts without departing from the spirit of the invention as defined by the subjoined claims.

Having thus described my invention, what I claim as new and desire to secure by Letters Patent of the United States is:

1. An oven, comprising: a rear wall panel; a front wall including a door frame and a door; a metallic sheet bent to form top and side wall panels, said side wall panels having long-radius inwardly curved lower ends terminating in wide inturned flanges defining marginal portions of a bottom wall; a removable one-lamina bottom member having marginal portions overlying said inturned flanges and spaced therefrom and defining horizontal air passages therebetween, said bottom member having a downwardly and reversely bent front lip for engagement with a horizontal plate-like member forming at least part of the sill portion of said door frame to support the front edge of said bottom member, said horizontal plate-like member having at least one opening therein, said front lip having at least one downwardly extending tab for close-fitting engagement in said opening in said horizontal plate-like member, said tab extending at an angle departing from the vertical sufficiently to retard accidental vertical displacement of the front edge of said bottom member.

2. An oven, comprising: a rear wall panel; a front wall including a door frame and a door; a metallic sheet bent to form top and side wall panels, said side wall panels having long-radius inwardly curved lower ends terminating in wide inturned flanges defining marginal portions of a bottom wall; a removable one-lamina bottom member having marginal portions overlying said inturned flanges and spaced therefrom and defining horizontal air passages therebetween; a gas burner beneath said bottom member, at least one lug on the upper portion of said burner, and a flat heat- and flame-deflecting baffle having socket means engaging said lug to support said baffle spaced from and underlying said bottom member.

3. An oven according to claim 2 and in which said baffle is formed of sheet metal and has upturned marginal flanges for adding to the rigidity thereof and for assuring proper spacing thereof from the under surface of said bottom member.

References Cited in the file of this patent
UNITED STATES PATENTS

| | | |
|---|---|---|
| 737,813 | Babbitt | Sept. 1, 1903 |
| 858,790 | Breen | July 2, 1907 |
| 1,693,625 | Taylor | Dec. 4, 1928 |
| 1,717,222 | Kahn | June 11, 1929 |
| 1,776,929 | Reedy | Sept. 30, 1930 |
| 1,903,477 | Rolfson | Apr. 11, 1933 |
| 1,986,017 | Schneider | Jan. 1, 1935 |
| 2,040,675 | Shroyer | May 12, 1936 |
| 2,160,764 | Taylor | May 30, 1939 |
| 2,180,563 | Taylor | Nov. 21, 1939 |
| 2,207,358 | Rogers | July 9, 1940 |
| 2,496,750 | Reeves | Feb. 7, 1950 |